US012798360B2

(12) United States Patent
Manhire et al.

(10) Patent No.: US 12,798,360 B2
(45) Date of Patent: Nov. 17, 2026

(54) GEARED LINKAGE FOR IMPROVED DIAGNOSTICS ON KINEMATIC ASSEMBLY

(71) Applicant: Magna Exteriors Inc., Aurora (CA)

(72) Inventors: Jeffrey B. Manhire, Rochester, MI (US); Oliver Pace, Clarkston, MI (US); Daniel Vander Sluis, Rochester Hills, MI (US); Braendon R. Lindberg, Metamora, MI (US)

(73) Assignee: Magna Exteriors Inc., Aurora (CA)

( * ) Notice: Subject to any disclaimer, the term of this patent is extended or adjusted under 35 U.S.C. 154(b) by 344 days.

(21) Appl. No.: 18/692,474

(22) PCT Filed: Oct. 12, 2022

(86) PCT No.: PCT/US2022/046368
§ 371 (c)(1),
(2) Date: Mar. 15, 2024

(87) PCT Pub. No.: WO2023/064327
PCT Pub. Date: Apr. 20, 2023

(65) Prior Publication Data

US 2025/0121676 A1 Apr. 17, 2025

Related U.S. Application Data

(60) Provisional application No. 63/254,702, filed on Oct. 12, 2021.

(51) Int. Cl.
*B60K 11/08* (2006.01)

(52) U.S. Cl.
CPC ......... *B60K 11/085* (2013.01); *B60Y 2400/41* (2013.01); *B60Y 2400/70* (2013.01)

(58) Field of Classification Search
CPC .............. B60K 11/085; B60Y 2400/41; B60Y 2400/70; B60H 2001/3471; F24F 2013/1446
See application file for complete search history.

(56) References Cited

U.S. PATENT DOCUMENTS 5,735,137 A * 4/1998 Kim ...................... F24F 13/075 454/351
9,533,565 B2 1/2017 Elliott et al.
(Continued)

FOREIGN PATENT DOCUMENTS

CN 209479413 U 10/2019
DE 102019128756 A1 * 4/2020 ............. B60K 11/06
(Continued)

OTHER PUBLICATIONS

Notification of Transmittal of the International Search Report and the Written Opinion of the International Searching Authority or the Declaration—National Application No. PCT/US2022/046268, Mailed Mar. 14, 2023.

*Primary Examiner* — Ngoc T Nguyen

(57) ABSTRACT

A kinematic linkage assembly for a vehicle active grille shutter system. The kinematic linkage assembly includes a kinematic end cap with a driven gear and one or more driven gears connected to the driven gear. The driven gear includes a driven portion connected to an actuator. A gear portion of the driven gear circumscribes the driven portion. When a drive vane is engaged to the drive gear the gear portion and drive vane will rotate together. If the driven vane is missing the driven vane will rotate independently of the gear portion and none of the vanes of the assembly will be driven by the actuator.

19 Claims, 10 Drawing Sheets

(56) References Cited

U.S. PATENT DOCUMENTS

| | | | | |
|---|---|---|---|---|
| 2016/0348930 | A1* | 12/2016 | Mirante | F24F 11/58 |
| 2017/0297424 | A1 | 10/2017 | Ibanez et al. | |

FOREIGN PATENT DOCUMENTS

| | | | | | |
|---|---|---|---|---|---|
| KR | 100319373 | B1 | * | 1/2002 | F24F 13/1426 |
| KR | 100420357 | B1 | * | 3/2004 | F24F 13/1426 |
| KR | 20200040085 | A | * | 4/2020 | F24F 11/33 |

* cited by examiner

GEARED LINKAGE FOR IMPROVED DIAGNOSTICS ON KINEMATIC ASSEMBLY

CROSS-REFERENCE TO RELATED APPLICATIONS

This application is an International Patent Application and claims benefit of U.S. Provisional Patent Application No. 63/254,702, filed Oct. 12, 2021. The disclosure of the above application is incorporated herein by reference.

FIELD OF THE INVENTION

The present invention relates to a kinematic linkage assembly for providing improved diagnostics on active aerodynamic vehicle systems such as an active grille shutter assembly.

BACKGROUND OF THE INVENTION

Current Active Grille Shutters (AGS) do not provide adequate monitoring capability if components are damaged or missing. Aerodynamic performance may be degraded without knowledge by the driver. As such devices currently on the market may not be On Board Diagnostic (OBD-2) compliant because the OBD-2 system is not able to tell if the active grille shutter system is working properly or not. It is a goal in the art in the present invention to design an improved linkage, which uses a kinematic linkage design that allows vehicle control systems to accurately detect broken or missing components of the active grille shutter system using on board diagnostic detection.

Typical AGS assemblies have vanes that move between an open and closed position using a series of connected links, controlled by an actuator. The linkage is generally a single piece connecting all the vanes together. Due to the use of a single component, if some of the vanes are missing, the actuator cannot sense a difference, and a damaged assembly can go unnoticed. By making the linkage a series of geared vane connections it is possible to eliminate the one piece linkage and provide a way for the on-board diagnostics of the vehicle to detect a missing or damaged AGS, which is sensed by over rotation of the gears.

Further areas of applicability of the present invention will become apparent from the detailed description provided hereinafter. The detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 8A is a side elevational view of the kinematic end cap with the drive gear and driven gears in the second rotationally engaged position.

DETAILED DESCRIPTION OF THE PREFERRED EMBODIMENTS

The following description of the preferred embodiments are merely exemplary in nature and is in no way intended to limit the invention, its application, or uses.

Figure 9A:
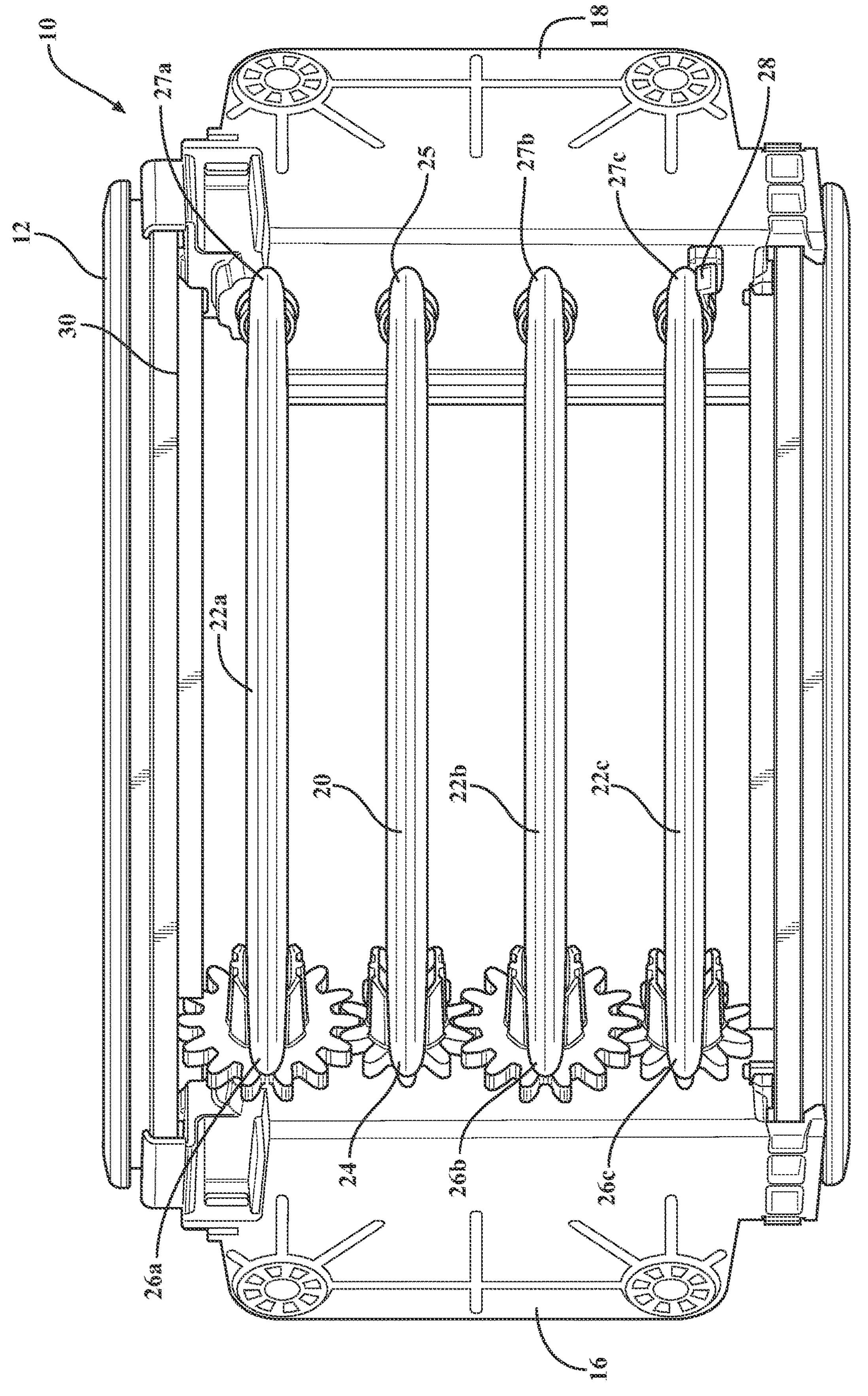
FIG. 9A is a side elevational view of a kinematic linkage assembly in the open position.
Figure 9B:
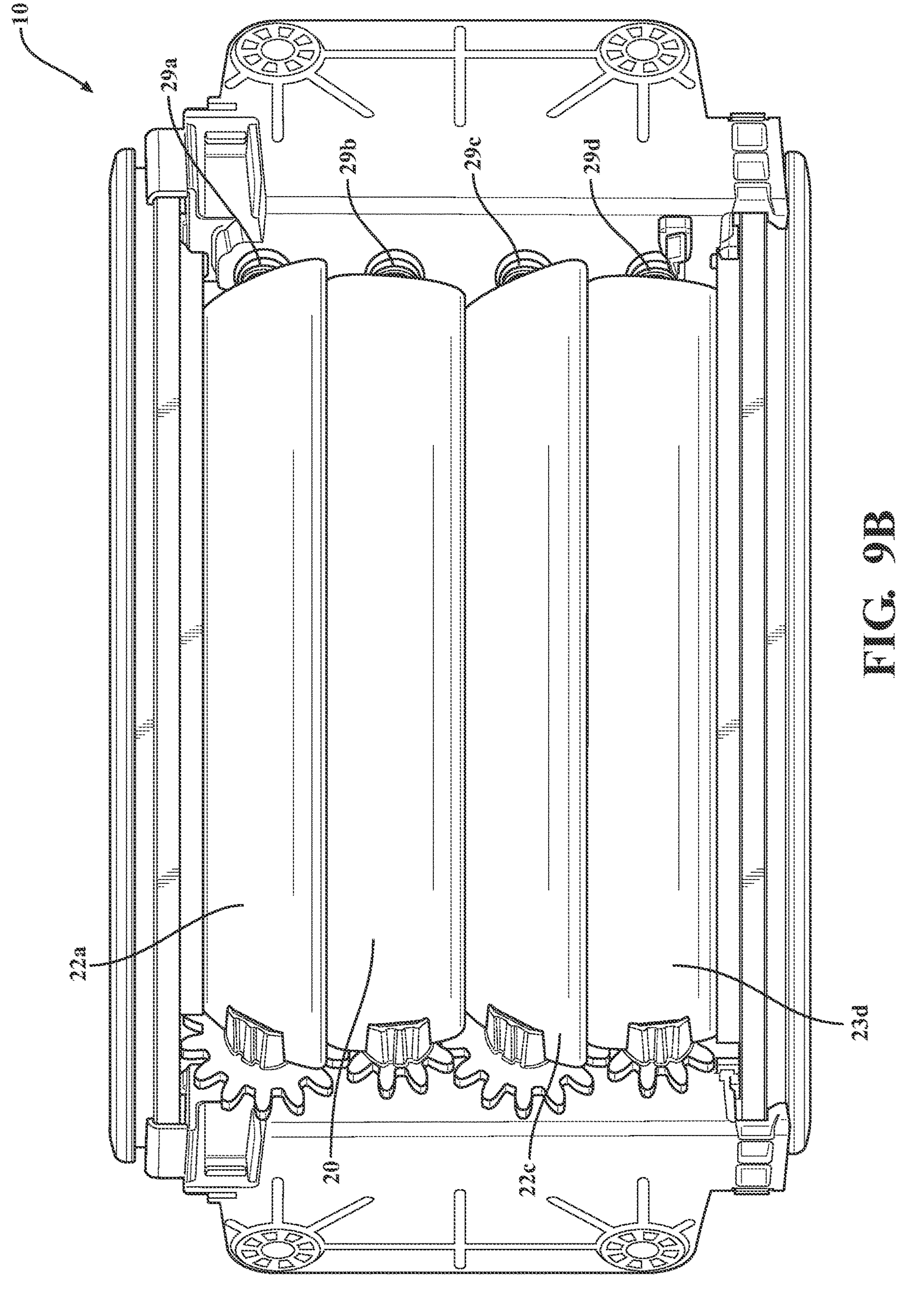
FIG. 9B is a side elevational view of a kinematic linkage assembly in the closed position.

Referring now to the figures, with particular reference to FIGS. 9A and 9B a kinematic linkage assembly 10 for an active grille shutter system according to a first embodiment of the invention is shown. The kinematic linkage assembly 10 has a frame 12 having formed an aperture 14, wherein the frame 12 is connectable to a vehicle engine compartment and has a kinematic end cap 16 and an end cap 18 at opposing sides of the aperture 14.

While a single kinematic end cap 16 and end cap 18 are shown with three vanes it is within the scope of the invention for the kinematic linkage assembly 10 to have a greater number of kinematic end caps, end caps and vanes depending on the desired size of the kinematic linkage assembly. In some embodiments the kinematic linkage assembly is modular and the kinematic end cap and end cap each have connecting features that allows them to be connected together or stacked to form kinematic linkage assemblies of greater heights. Also, the vanes can be formed from extrusion allowing the vanes to have any type of length depending on the needs of a particular application. An example of the connecting features between end caps and the extruded vanes is described in U.S. Pat. No. 10,960,754, issued Mar. 30, 2021, titled "MOLD ASSEMBLY FOR ACTIVE GRILLE SHUTTER SYSTEM" to Lindberg et al, the entire patent is hereby expressly incorporated by reference.

Figure 1:
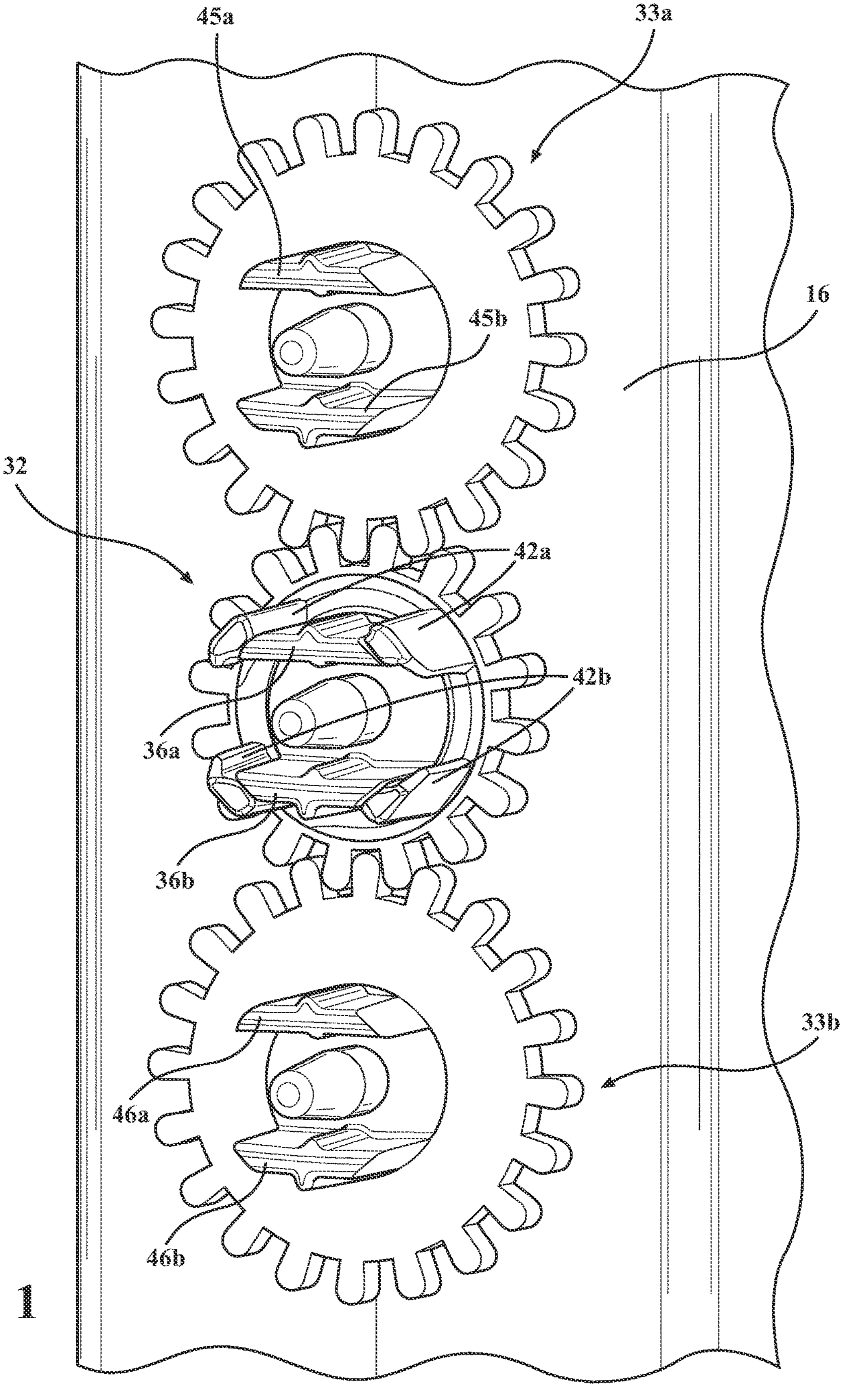
FIG. 1 is an enlarged side elevational view of a kinematic end cap.
Figure 2:
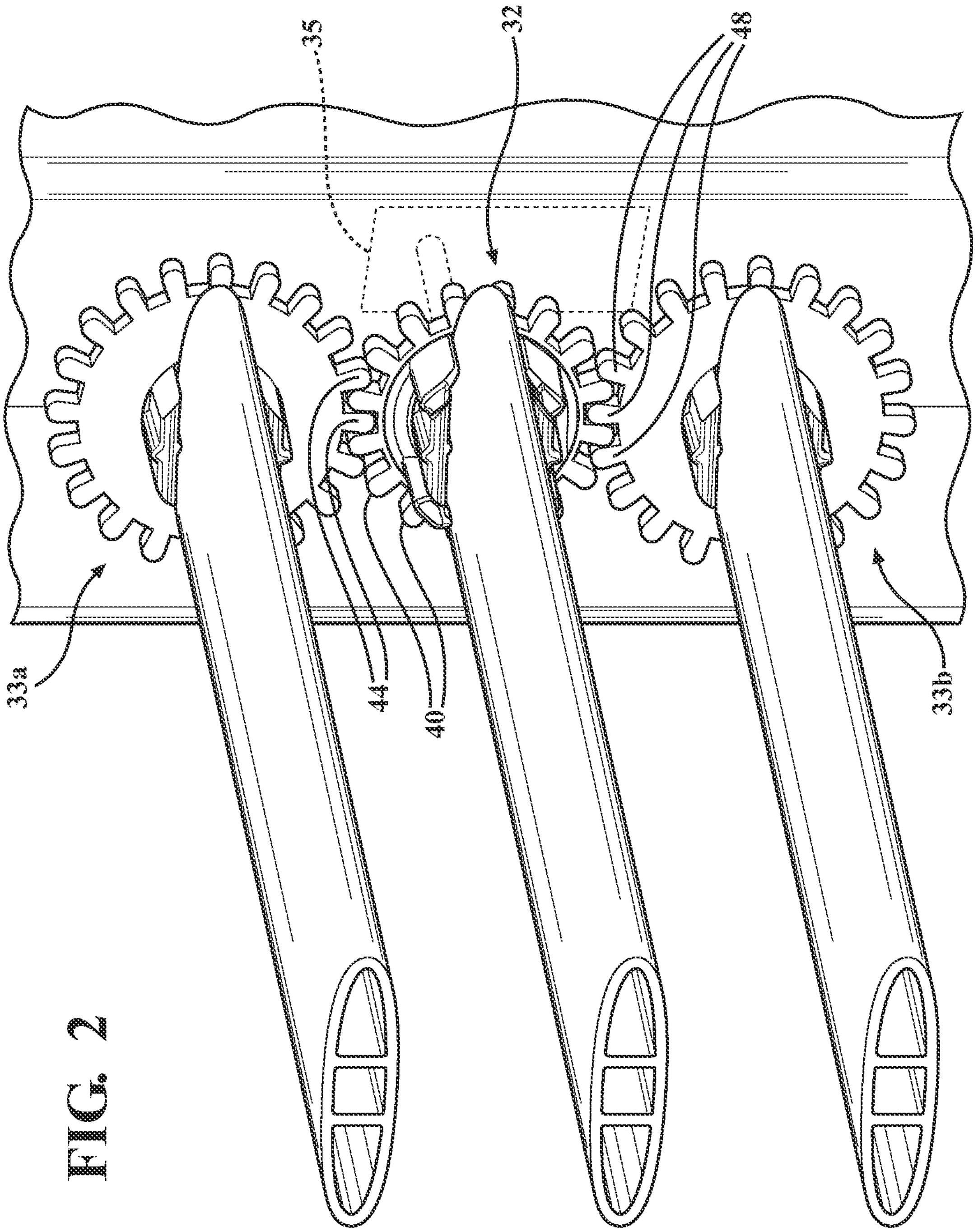
FIG. 2 is a side perspective view of a kinematic end cap with vanes connected in the open position according to one embodiment of the invention.
Figure 3:
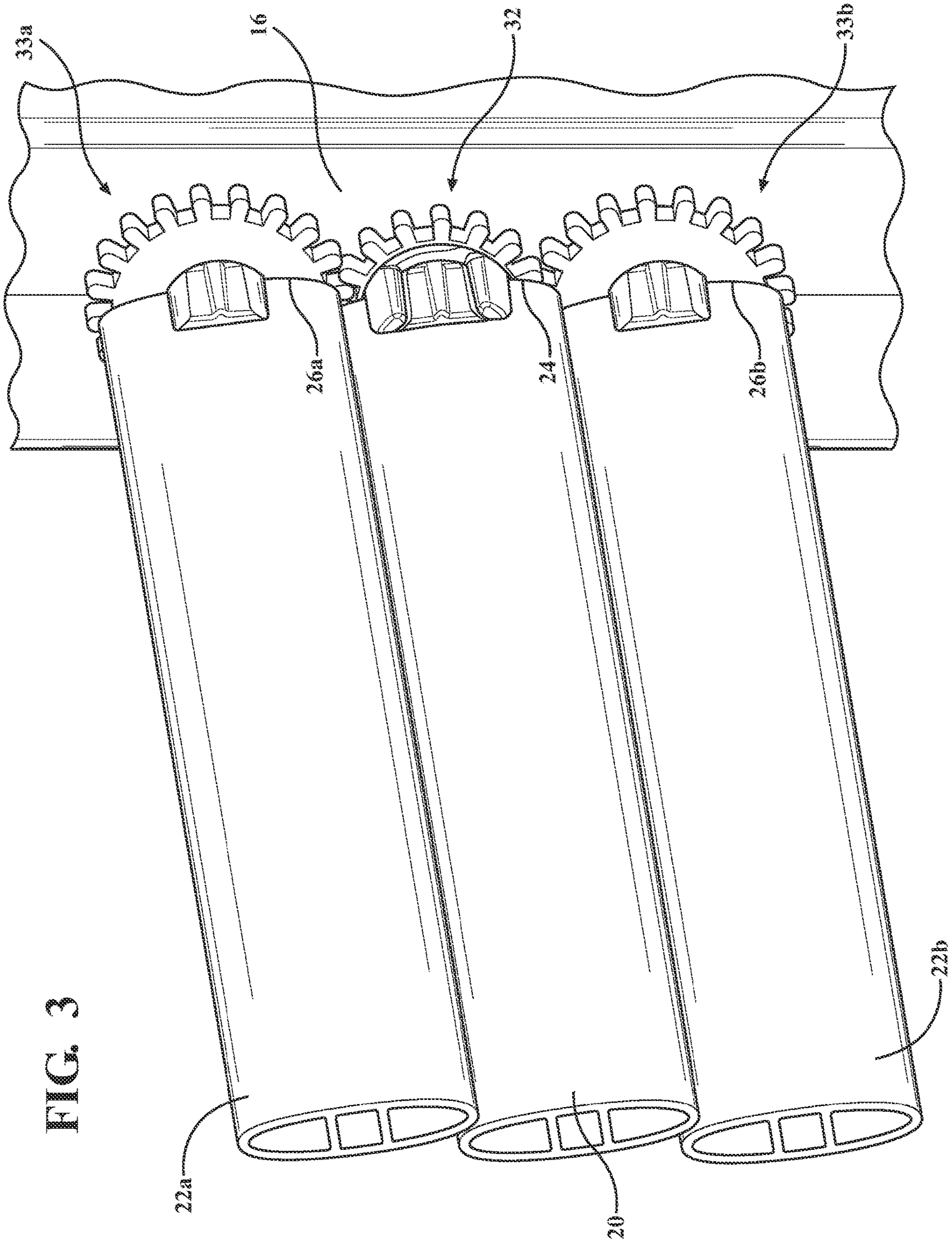
FIG. 3 is a side perspective view of a kinematic end cap with vanes connected in the closed position according to one embodiment of the invention.

Referring now to all the figures, the kinematic linkage assembly 10 includes a drive vane 20 and a plurality of driven vanes 22*a*, 22*b*, 22*c*, wherein the drive vane 20 has a first end 24 and the plurality of driven vanes 22*a*, 22*b*, 22*c* each have a first end 26*a*, 26*b*, 26*c* each connected to the kinematic end cap 16. The drive vane 20 has a second end 25 and the plurality of driven vanes 22*a*, 22*b*, 22*c* each have a second end 27*a*, 27*b*, 27*c*, all of which are rotatably connected respectively to a rotatable holder 29*a*, 29*b*, 29*c*, 29*d* connected to the end cap 18. During operation of the kinematic linkage assembly 10 the drive vane 20 and the plurality of driven vanes 22*a*, 22*b*, 22*c* are each moveable between an open position (shown in FIG. 2) and a closed position (shown in FIG. 3). In the embodiment shown in FIGS. 2 and 3 there is an open end stop 28 that driven vane 22*a* comes into contact with to prevent over rotation of the kinematic linkage assembly 10, while the driven vane 22*b* contacts a closed end stop 30 when the drive vane 20 and driven vanes 22*a*, 22*b*, 22*c* are rotated to the closed position. When the drive vane 20 and the driven vanes 22*a*, 22*b*, 22*c* are in the closed position air is prevented from moving through the aperture 14 of the frame 12. When the drive vane 20 and the driven vanes 22*a*, 22*b*, 22*c* are in the open position, air moves through the aperture 14 of the frame 12.

The kinematic linkage assembly 10 further includes a drive gear 32 rotatably connected to the kinematic end cap 16. The drive gear 32 has a portion 34 connected to an actuator 35 by a shaft that extends through the kinematic end cap 16 and engages the actuator 35 that is able to rotate the shaft bidirectionally depending on the desired position of the drive vane 20 and driven vanes 22*a*, 22*b*, 22*c*. The drive gear 32 further includes a gear portion 38 circumscribing the drive portion 34 and includes a plurality of teeth 40 on the outer circumference of the gear portion 38. The gear portion 38 has teeth that are in mesh engagement with teeth 44 formed on a first driven gear 33*a* and teeth 48 formed on the second driven gear 33*b*. The drive portion 34 has at least one pair of vane engagement fingers 36*a*, 36*b* and the gear portion 38 includes at least one pair of vane engagement tabs 42*a*, 42*b*, both of which are configured to connect to the first end 24 of the drive vane 20.

Figure 6A:
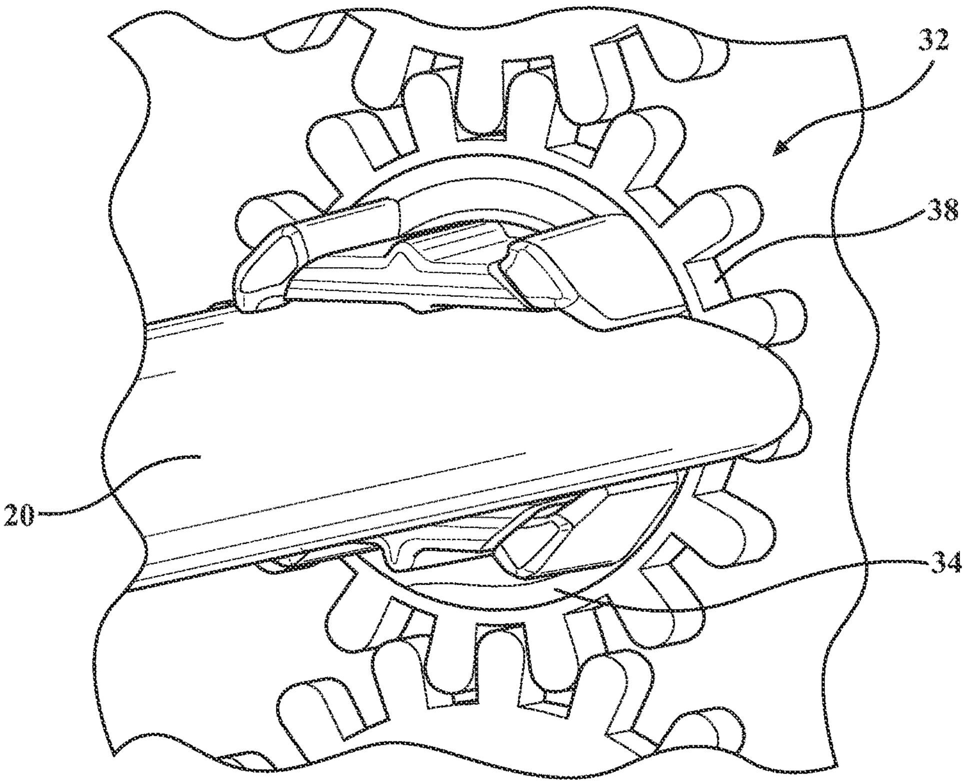
FIG. 6A is an enlarged perspective view of the drive gear with drive vane connected.
Figure 6B:
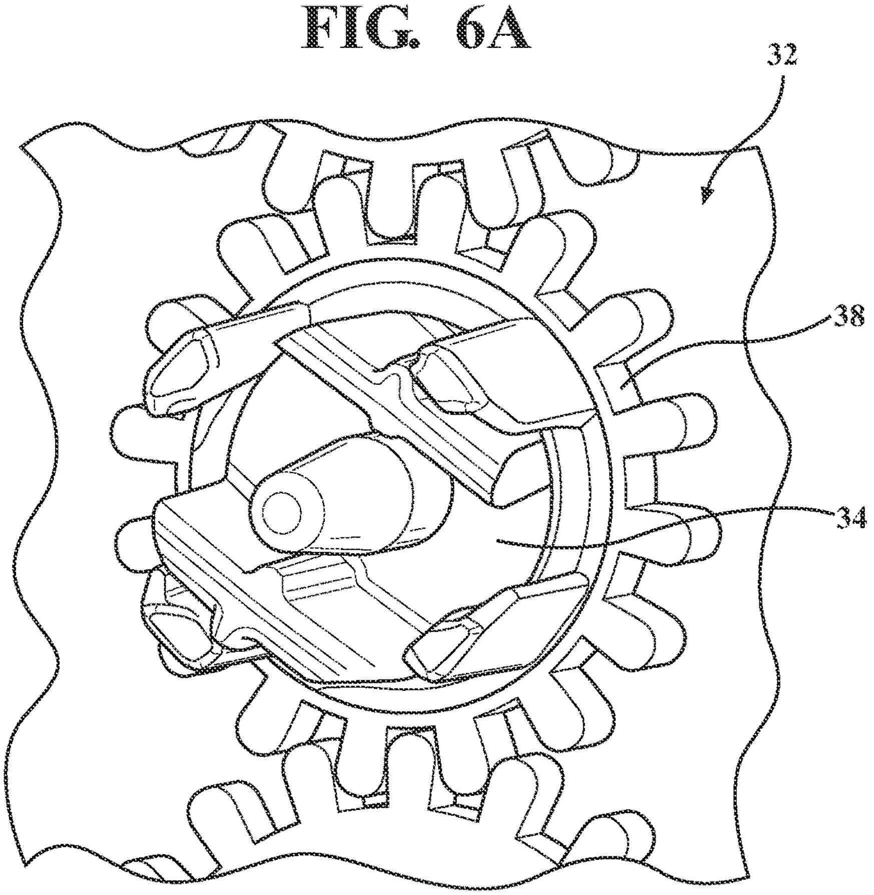
FIG. 6B is an enlarged perspective view of the drive gear with the drive vane missing.

Referring now to FIGS. 2, 3, 6A, 6B, 9 and 10 when the first end 24 of the drive vane 20 is held by both the vane engagement fingers 36*a*, 36*b* and vane engagement tabs 42*a*, 42*b*, the gear portion 38 and the drive portion 34 rotate together; as rotational force from the actuator 35 is transferred from the actuator 35 to the driven portion 34 and transferred through the first end 24 of the drive vane and onto the gear portion 38. If the first end 24 of the vane 20 is not held by both the vane engagement fingers 36*a*, 36*b* and vane engagement tabs 42*a*, 42*b*, such as when the drive vane 20 is broken or missing, the drive portion 34 will rotate independently of the gear portion and there will be no rotational force transfer from the drive portion 34 to the gear portion 38, as shown in FIG. 6B. Subsequently rotational force will not be transferred from the actuator 35 to the first driven gear 33*a* and the second driven gear 33*b* that are located adjacent the drive gear 32.

The first driven gear 33*a* has at least one pair of vane engagement fingers 45*a*, 45*b* configured to connect to the first end 26*a* of the driven vane 26*a*. The plurality of teeth 44 on the outer circumference of the first driven gear 33*a* are in mesh engagement with the plurality of teeth 40 of the gear portion 38 of the drive gear 32 so that rotation of the drive gear 32 causes rotation of the first driven gear 33*a*. The second driven gear 33*b* has at least one pair of vane engagement fingers 46*a*, 46*b* configured to connect to the first end 26*b* of a second one of the plurality of driven vanes 22*b*. The second driven gear 33*b* also includes the plurality of teeth 48 on the outer circumference of the second driven gear 33*b* that are in mesh engagement with the plurality of teeth 40 of the drive gear 32 so that rotation of the drive gear 32 causes rotation of the second driven gear 33*b*.

Figure 4B:
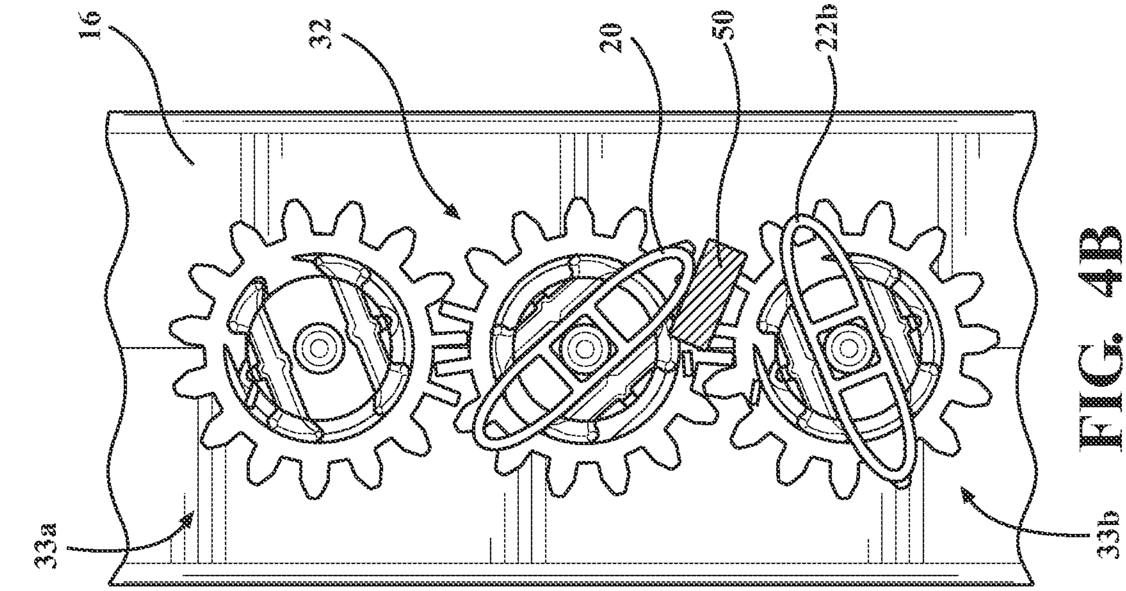
FIG. 4B is a side elevational view of the end cap with the top vane missing.
Figure 4A:
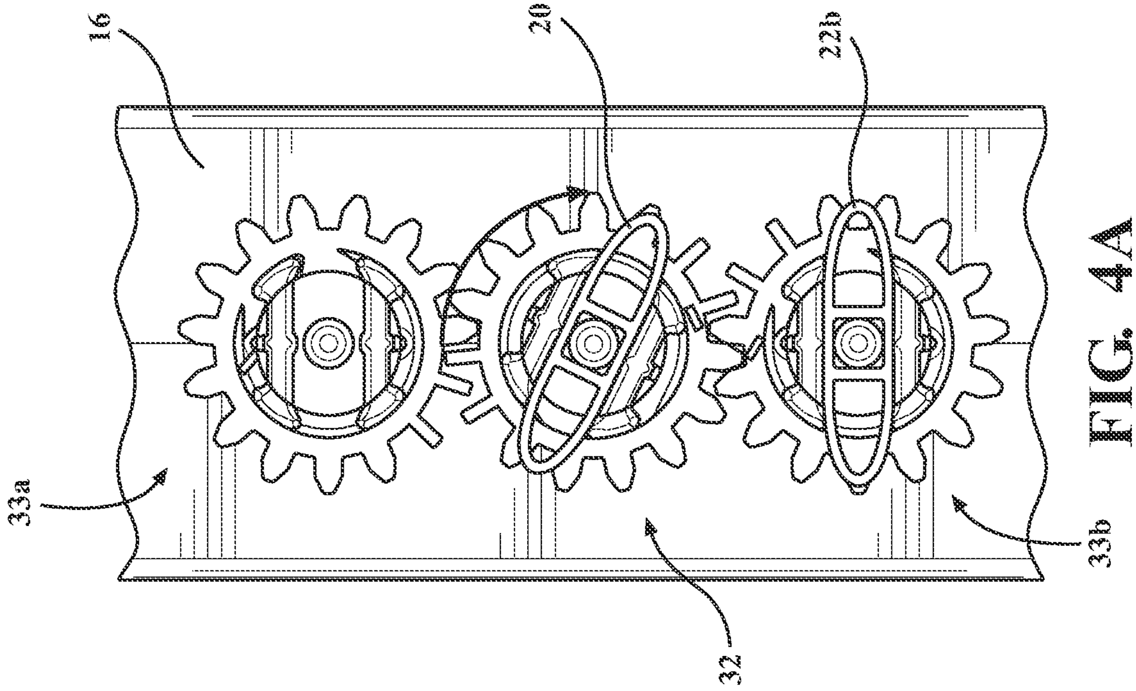
FIG. 4A is a side elevational view of an end cap with the top vane missing.

Referring also to FIGS. 4A and 4B the rotation of the kinematic linkage assembly 10 when the driven vane 22*a* (i.e., the upper vane relative to the driven vane 20) is broken or missing. The drive vane 20 is rotated in the direction of the arrow shown in FIG. 4A and will rotate without the driven vane 22*a* being present. However, an error code will be generated by sensors in the actuator due to differential rotation of the drive gear 32 causing over rotation of the drive vane 20. Also, an optional safety stop 50 (shown schematically) can be positioned on the kinematic assembly or somewhere on the frame 12 to arrest travel of the drive vane 20 to prevent it from travelling too far and re-closing the aperture 14.

Figure 5C:
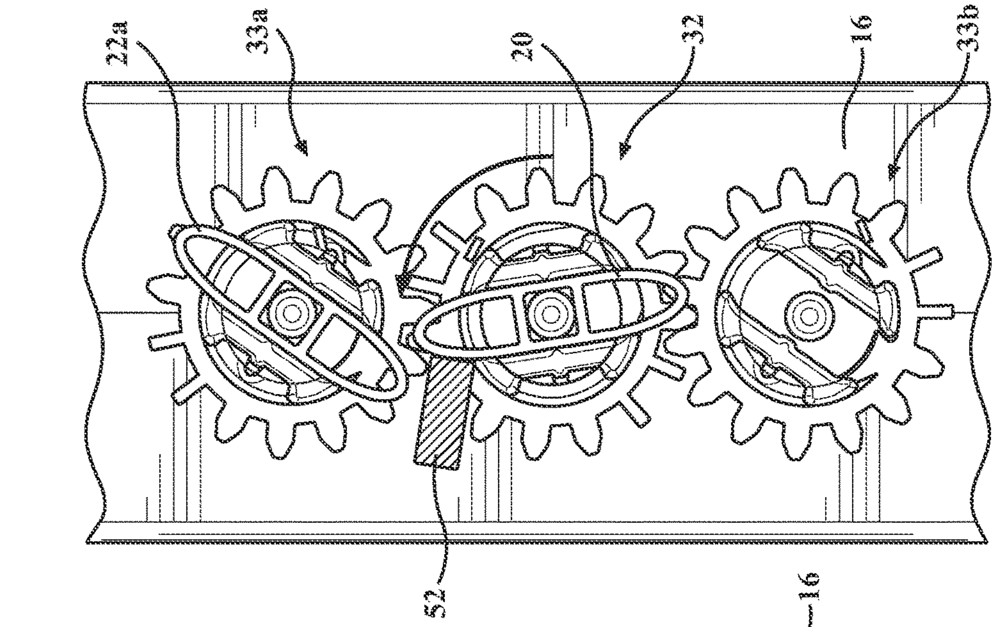
FIG. 5C is a side elevational view of an end cap with the bottom vane missing.
Figure 5B:
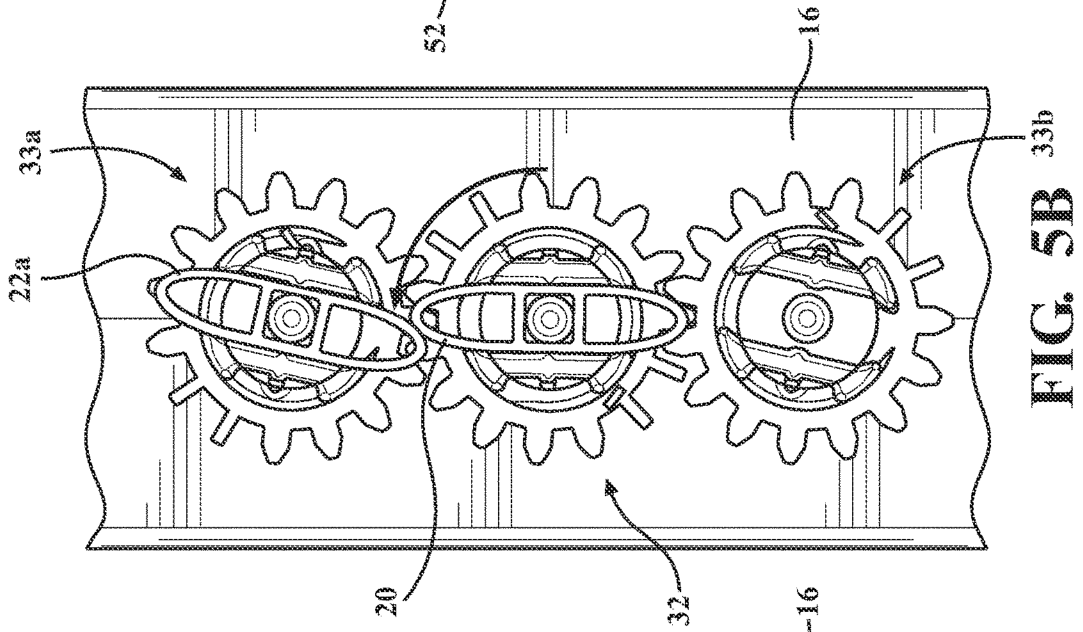
FIG. 5B is a side elevational view of an end cap with the bottom vane missing.
Figure 5A:
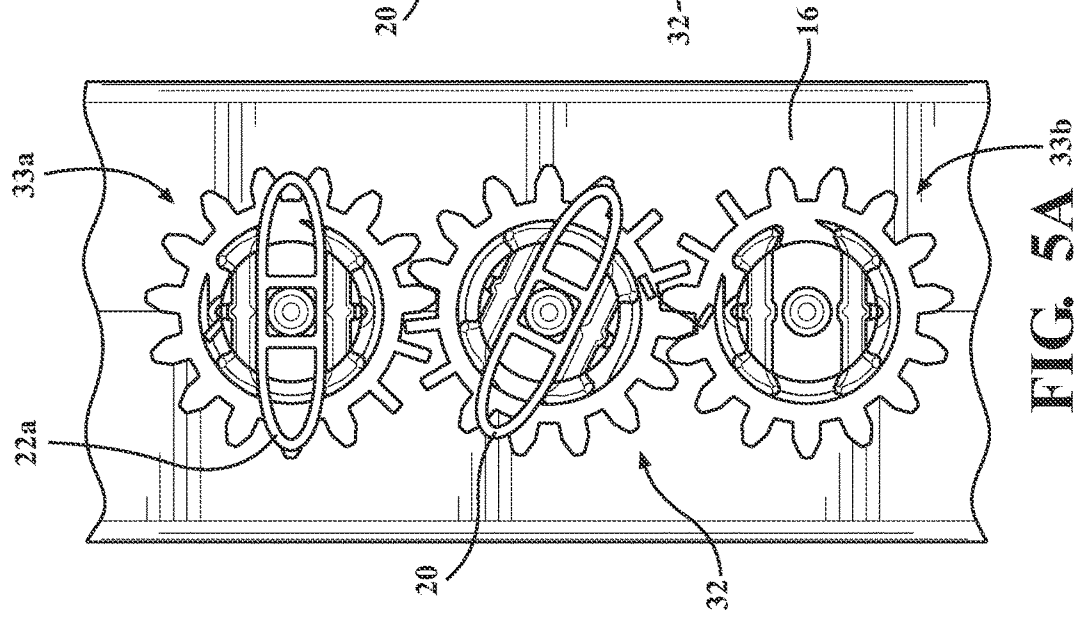
FIG. 5A is a side elevational view of an end cap with the bottom vane missing.

Referring also to FIGS. 5A, 5B and 5C the rotation of the kinematic linkage assembly 10 when the driven vane 22*b* (i.e., the lower vane relative to the driven vane 20) is broken or missing. The drive vane 20 is rotated in the direction of the arrow shown in FIG. 5B and will rotate without the driven vane 22*b* being present. However, an error code will be generated by sensors in the actuator due to differential rotation of the drive gear 32 causing over rotation of the drive vane 20. Also, an optional safety stop 52 (shown schematically) can be positioned on the kinematic assembly or somewhere on the frame 12 to arrest travel of the drive vane 20 to prevent it from travelling too far and re-closing the aperture 14.

Figure 7C:
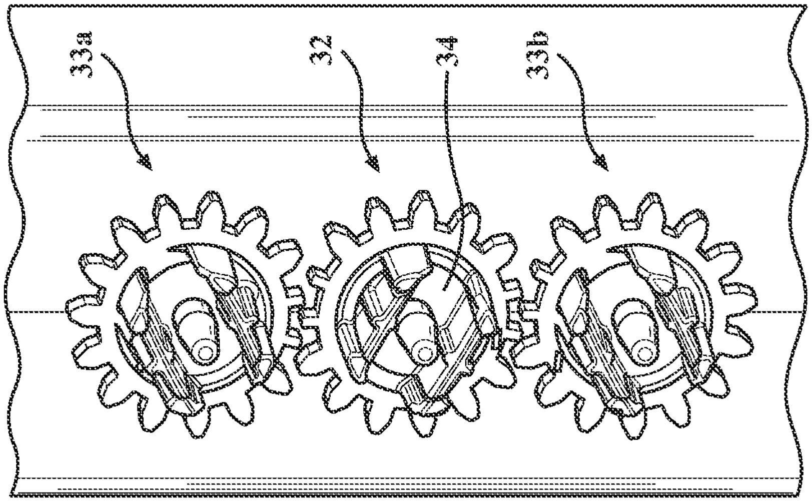
FIG. 7C is a side perspective view of the formation of the kinematic end cap.
Figure 7B:
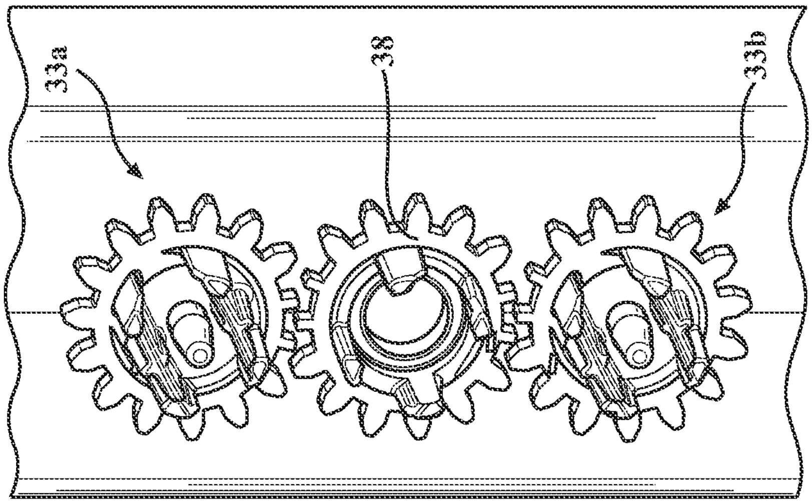
FIG. 7B is a side perspective view of the formation of the kinematic end cap.
Figure 7A:
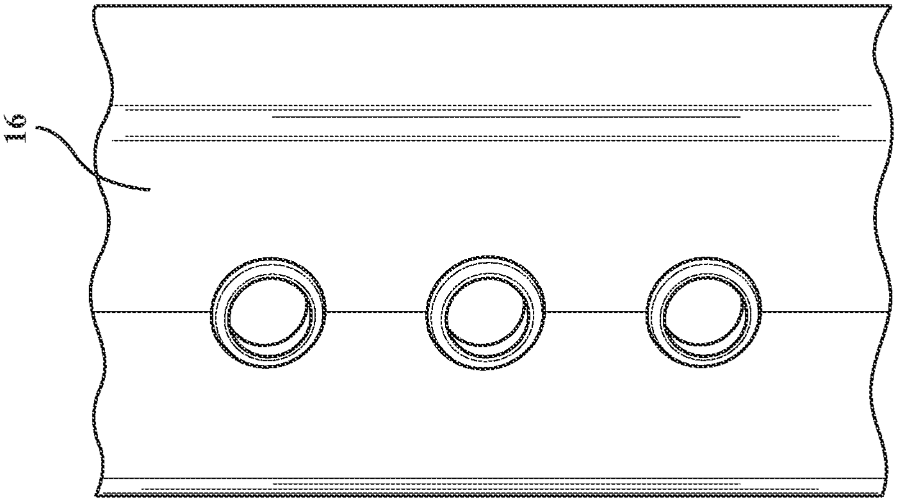
FIG. 7A is a side perspective view of the formation of the kinematic end cap.
Figure 8C:
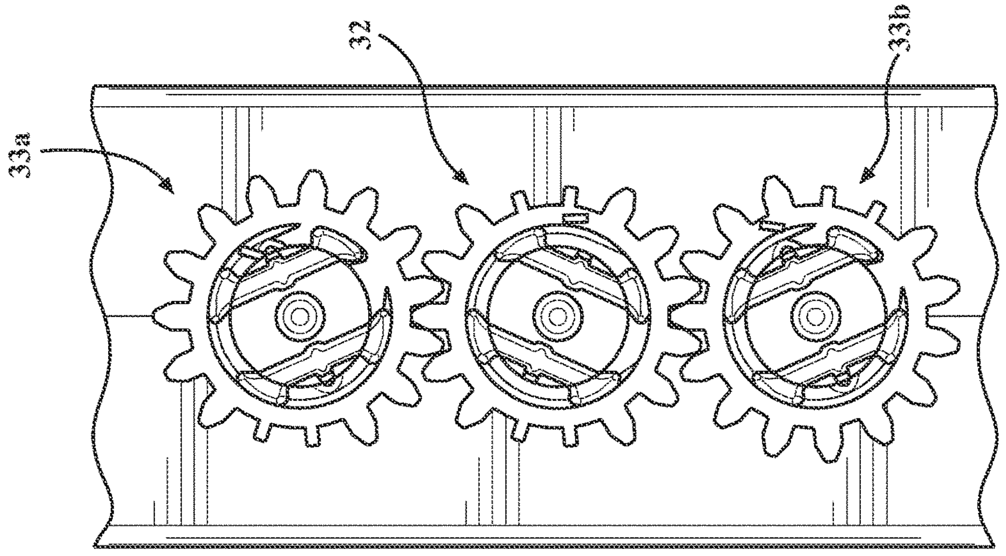
FIG. 8A is a side elevational view of the kinematic end cap with the drive gear and driven gears in the forming position.
FIG. 8B is a side elevational view of the kinematic end cap with the drive gear and driven gears in the first rotationally engaged position.
Figure 8B:
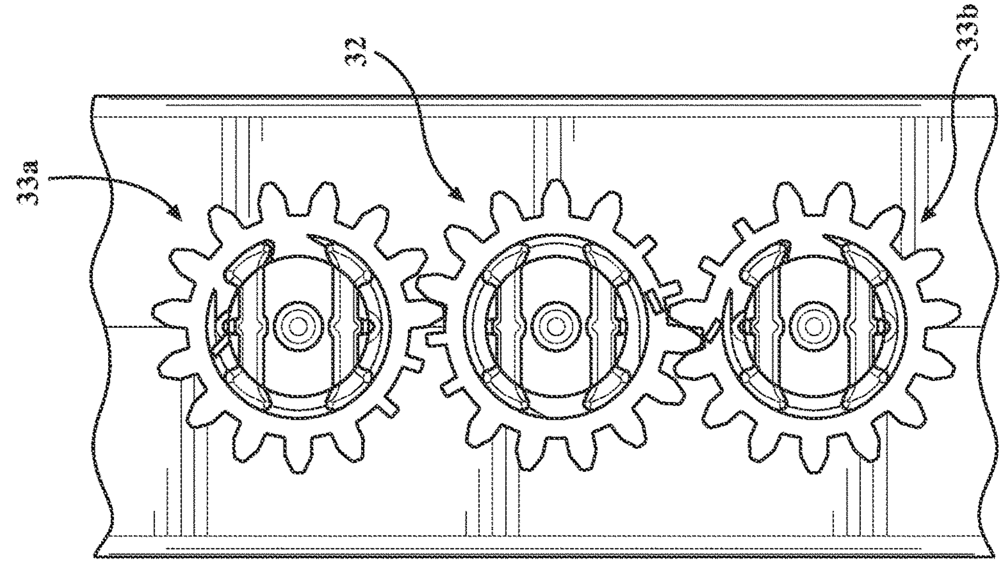
Figure 8A:
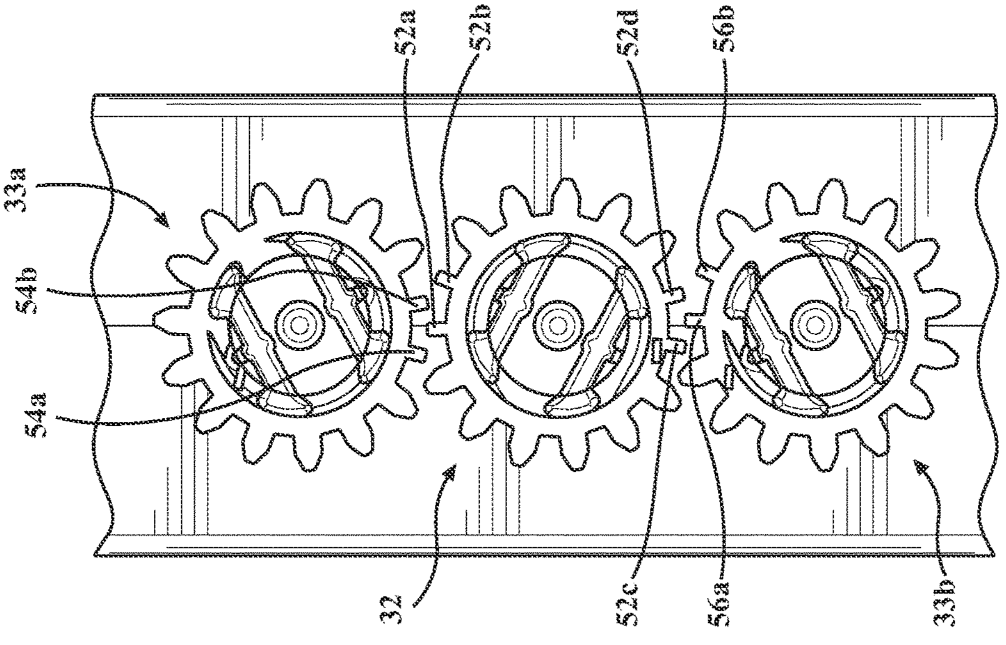

Referring now to FIGS. 7A, 7B and 7C a method of forming the kinematic end cap 16 with the drive gear 32 and driven gears 33*a*, 33*b* is shown. The method involves three steps. As shown in FIG. 7A the kinematic end cap 16 is formed by a first molding step. During a second molding step, shown in FIG. 7B the driven gears 33*a*, 33*b* and gear portion 38 of the drive gear 32 are all formed. Lastly during a third molding step, shown in FIG. 7C the drive portion 34 is separately molded into the aperture of the gear portion 38. This allows for the drive portion 34 to be rotatable within the gear portion. Referring now to FIGS. 8A, 8B and 8*c* formation of the drive gear 32 and driven gears 33*a*, 33*b* on the kinematic end cap 16 is now described in view of the tooling considerations and requirements. One problem is that the drive gear 32 and driven gears 33*a*, 33*b* must be molded in a way that they will be formed separately so they do not stick together, yet in operation they must be able to come into contact. To address this problem the gear portion 38 of the drive gear 32 has small teeth 52*a*, 52*b*, 52*c*, 52*d*, driven gear 33*a* has two small teeth 54*a*, 54*b* and driven gear 33*b* has two small teeth 56*a*, 56*b*. In FIG. 8A the drive gear 32, driven gear 33*a* and driven gear 22*b* are all in the molding position and are formed so that the small teeth 52*a*, 52*b* of drive gear 32 are adjacent small teeth 54*a*, 54*b* of the driven gear 33*a* and will not touch. Likewise small teeth 52*c*, 52*c* of drive gear 32 are adjacent small teeth 56*a*, 56*b* of the driven gear 33*b* are formed and will not touch. Then as shown in FIG. 8B the drive gear 32 and driven gears 33*a*, 33*b* are rotated so that the larger teeth are in engagement when the kinematic linkage assembly 10 is in the fully open position. Likewise in FIG. 8C the drive gear 32 and driven gears 33*a*, 33*b* are rotated so that the larger teeth are in engagement when the kinematic linkage assembly 10 is in the fully closed position. While six small teeth are shown, it is within the scope of the invention for there to be a greater or lesser number of small teeth on the drive gear 32 and driven gears 33*a*, 33*b* depending on the needs of a particular application, which include the size, configuration and number of gears.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A kinematic linkage assembly for an active grille shutter system comprising:

a frame forming an aperture, wherein the frame is connectable to a vehicle and has a kinematic end cap and an end cap at opposing sides of the aperture;

a drive vane and at least one driven vane, wherein the drive vane and the at least one driven vane are each connected to the kinematic end cap at a first end and the end cap at a second end, wherein the drive vane and the at least one driven vane are each moveable between an open position and a closed position, such that when the drive vane and the at least one driven vane are in the open position, more air moves through the aperture of the frame than when the drive vane and the at least one driven vane are in the closed position;

a drive gear rotatably connected to the kinematic end cap, the drive gear has a drive portion connected to an actuator, and the drive gear includes a gear portion having a plurality of teeth, wherein the drive portion has a pair of vane engagement fingers configured to engage the first end of the drive vane, and the gear portion has at least one pair of vane engagement tabs configured to engage the first end of the drive vane and so that a rotational force from an actuator is transferred from the drive portion to the gear portion through the drive vane, and at least one driven gear rotatably connected to the kinematic end cap and at least one driven vane, wherein the at least one driven gear includes a plurality of teeth on a gear portion of the at least one driven gear that are in mesh engagement with the plurality of teeth of the gear portion of the drive gear so that rotation of the drive gear causes rotation of the at least one driven gear.

2. The kinematic linkage assembly of claim 1 wherein the gear ratio of the drive gear to the at least one driven gear is 1:1.

3. The kinematic linkage assembly of claim 1 wherein the at least one driven gear has at least one pair of vane engagement fingers configured to connect to the first end of the at least one driven vane.

4. The kinematic linkage assembly of claim 1, wherein when the first end of the drive vane is not engaged with the vane engagement fingers and the vane engagement tabs, the drive portion for the drive gear rotates independent of the gear portion of the drive gear when rotational force is applied to the drive gear.

5. The kinematic linkage assembly of claim 1 further comprising a closed end stop on the frame that the at least one driven vane contacts when the at least one driven vane is rotated to the closed position.

6. The kinematic linkage assembly of claim 1 further comprising an open end stop on the frame that contacts the at least one driven vane when the at least one driven vane is rotated to the open position, wherein the open end stop prevents over rotation of the at least one driven vane.

7. The kinematic linkage assembly of claim 1 further comprising an actuator connected to the drive portion of the drive gear so that the drive portion rotates when rotated by the actuator.

8. The kinematic linkage assembly of claim 7 wherein the actuator has a normal range of travel with an upper limit and a lower limit and when the actuator moves past the upper limit or the lower limit the actuator generates a fault code.

9. The kinematic linkage assembly of claim 1 wherein the vane engagement fingers are received inwardly of the vane engagement tabs relative to an axis of rotation of the drive vane.

10. A kinematic linkage assembly for an active grille shutter system comprising:

a frame forming an aperture, wherein the frame is connectable to a vehicle and has a kinematic end cap and an end cap at opposing sides of the aperture;

a drive vane and at least one driven vane, wherein the drive vane and the at least one driven vane are each connected to the kinematic end cap at a first end and the end cap at a second end, wherein the drive vane and the at least one driven vane are each moveable between an open position and a closed position, such that when the drive vane and the at least one driven vane are in the open position, more air moves through the aperture of the frame than when the drive vane and the at least one driven vane are in the closed position;

a drive gear rotatably connected to the kinematic end cap, the drive gear has a drive portion connected to an actuator, and the drive gear includes a gear portion having a plurality of teeth, wherein the first end of the drive vane is connected to the drive gear;

at least one driven gear rotatably connected to the kinematic end cap and at least one driven vane, wherein the at least one driven gear includes a gear portion with a plurality of teeth that are in mesh engagement with the plurality of teeth of the gear portion of the drive gear so that rotation of the drive gear causes rotation of the at least one driven gear; and a plurality of small teeth on the drive gear and a plurality of small teeth on the at least one driven gear positioned adjacent the plurality of small teeth on the drive gear during formation of the drive gear and the at least one driven gear so that there is no contact between the plurality of small teeth on the driven gear and the plurality of small teeth on the drive gear.

11. A kinematic linkage assembly for an active grille shutter system comprising:

a frame having an aperture, wherein the frame is connectable to a vehicle engine compartment and has a kinematic end cap and an end cap at opposing sides of the aperture;

a drive vane and a plurality of driven vanes, wherein the drive vane and the plurality of driven vanes are each connected to the kinematic end cap at a first end and the end cap at a second end, wherein the drive vane and the plurality of driven vanes are each moveable between an open position and a closed position, such that when the drive vane and the plurality of driven vanes are in the open position, more air moves through the aperture of the frame than when the drive vane and the plurality of driven vanes are in the closed position;

a drive gear rotatably connected to the kinematic end cap, the drive gear has a drive portion connected to an actuator, and the drive gear has a gear portion having a plurality of teeth;

an actuator connected to the drive portion so that the drive portion rotates when rotated by the actuator;

a first driven gear rotatably connected to the kinematic end cap and a first one of the plurality of driven vanes, the first driven gear has a plurality of teeth that are in mesh engagement with the plurality of teeth of the gear portion of the drive gear so that rotation of the gear portion of the drive gear causes rotation of the first driven gear, and a second driven gear rotatably connected to the kinematic end cap and a second one of the plurality of driven vanes, the second driven gear has a plurality of teeth that are in mesh engagement with the plurality of teeth of the first driven gear so that rotation of the first driven gear causes rotation of the second driven gear, wherein the gear portion has at least one pair of vane engagement tabs arranged to engage the drive vane, the drive portion has at least one pair of vane engagement fingers arranged to engage the drive vane thereby allowing the gear portion of the drive gear and the drive portion to rotate together as rotational force from the actuator is transferred from the actuator to the drive portion and from the drive portion to the gear portion through the first end of the drive vane.

12. The kinematic linkage assembly of claim 11 wherein the gear ratio of the drive gear to the first driven gear and second driven gear is 1:1.

13. The kinematic linkage assembly of claim 11 wherein the first driven gear has at least one pair of vane engagement fingers to connect to the first end of the first one of the plurality of driven vanes and the second driven gear has at least one pair of vane engagement fingers to connect to the first end of the second one of the plurality of driven vanes.

14. The kinematic linkage assembly of claim 11, wherein when the first end of the drive vane is not engaged with the vane engagement fingers or the vane engagement tabs, the drive portion rotates independent of the gear portion when rotational force from the actuator is applied to the drive portion.

15. The kinematic linkage assembly of claim 11 further comprising a closed end stop on the frame that the first one of the plurality of driven vanes contacts when rotated to the closed position.

16. The kinematic linkage assembly of claim 11 further comprising an open end stop on the frame that contacts the second one of the plurality of driven vanes when rotated to the open position, wherein the open end stop prevents over rotation of the second one of the plurality of driven vanes.

17. The kinematic linkage assembly of claim 11 further comprising:

a plurality of small teeth on the drive gear, a plurality of small teeth on the first driven gear positioned adjacent one or more of the plurality of small teeth on the drive gear, a plurality of small teeth on the second driven gear positioned adjacent one or more of the plurality of small teeth on the drive gear, wherein during formation of the drive gear, the first driven gear and the second driven gear, there is no contact between the plurality of small teeth on the first driven gear, the plurality of small teeth on the second drive gear and the plurality of small teeth on the drive gear.

18. The kinematic linkage assembly of claim 11 wherein the actuator has a normal range of travel with an upper limit and a lower limit and when the actuator moves past the upper limit or the lower limit the actuator generates a fault code.

19. The kinematic linkage assembly of claim 11 wherein the vane engagement fingers are received inwardly of the vane engagement tabs relative to an axis of rotation of the drive vane.

* * * * *